United States Patent
Yamaguchi et al.

(10) Patent No.: US 9,172,904 B2
(45) Date of Patent: Oct. 27, 2015

(54) INFORMATION PROCESSING APPARATUS DISPLAYING INDICES OF VIDEO CONTENTS, INFORMATION PROCESSING METHOD AND INFORMATION PROCESSING PROGRAM

(75) Inventors: Kenji Yamaguchi, Higashiosaka (JP); Masaki Sato, Daito (JP); Hidehito Taniura, Osaka (JP)

(73) Assignee: Kyocera Corporation, Kyoto (JP)

( * ) Notice: Subject to any disclaimer, the term of this patent is extended or adjusted under 35 U.S.C. 154(b) by 411 days.

(21) Appl. No.: 13/360,631

(22) Filed: Jan. 27, 2012

(65) Prior Publication Data
US 2012/0128318 A1 May 24, 2012

Related U.S. Application Data

(63) Continuation of application No. 11/865,992, filed on Oct. 2, 2007, now Pat. No. 8,132,211.

(30) Foreign Application Priority Data

Oct. 2, 2006 (JP) ................. 2006-271184

(51) Int. Cl.
*H04N 5/77* (2006.01)
*G11B 27/10* (2006.01)
*H04N 9/82* (2006.01)

(52) U.S. Cl.
CPC .............. *H04N 5/772* (2013.01); *G11B 27/105* (2013.01); *H04N 9/8227* (2013.01)

(58) Field of Classification Search
CPC .................. H04N 2005/4441; H04N 5/44543; H04N 5/44591; H04N 21/252; H04N 21/26258; H04N 21/2668; H04N 21/47202; H04N 21/4756; H04N 21/4788; H04N 21/4882; H04N 7/17318; H04N 1/00204; H04N 21/4312; H04N 21/4622; H04N 21/47; H04N 2201/325; H04N 2201/3277; H04N 1/00167; H04N 1/00323; H04N 1/00397; H04N 1/00424; H04N 1/0044; H04N 1/32101; H04N 21/482; H04N 21/84; H04N 2201/00
See application file for complete search history.

(56) References Cited

U.S. PATENT DOCUMENTS 5,818,533 A   10/1998  Auld et al.
2001/0009604 A1*  7/2001  Ando et al. ............... 386/95

(Continued)

FOREIGN PATENT DOCUMENTS

JP  2003-8904  1/2003
JP  2003-250126  9/2003

(Continued)

OTHER PUBLICATIONS

Office Action from Japanese Patent Application No. 2006-271184, mailed on Feb. 8, 2011.

*Primary Examiner* — Thai Tran
*Assistant Examiner* — Sunghyoun Park
(74) *Attorney, Agent, or Firm* — Duane Morris LLP

(57) ABSTRACT

In order to quicken switching of indices and reduce the time required for display after switching, a mobile phone includes a video content specifying portion to specify at least one video content, an index element generating portion to generate a thumbnail for a video content when accepting a generation instruction and to stop generation of the thumbnail when accepting a cancellation instruction, an index element generation requesting portion, in response to the event that a video content is specified by the video content specifying portion, to output a generation instruction including identification information identifying the specified video content to the index element generating portion, and a cancellation instructing portion to output a cancellation instruction to stop generation of the thumbnail for the already specified video content when a new video content is specified before completion of generation of the thumbnail for the already specified video content.

5 Claims, 8 Drawing Sheets

(56) References Cited

U.S. PATENT DOCUMENTS

| | | |
|---|---|---|
| 2003/0026594 A1* | 2/2003 | Shiiyama ............... 386/69 |
| 2003/0174160 A1* | 9/2003 | Deutscher et al. ........ 345/716 |
| 2006/0026376 A1 | 2/2006 | LaChapelle et al. |
| 2006/0064733 A1* | 3/2006 | Norton et al. ........... 725/135 |
| 2006/0120692 A1 | 6/2006 | Fukuta |
| 2008/0005087 A1 | 1/2008 | Sato et al. |

FOREIGN PATENT DOCUMENTS

| | | |
|---|---|---|
| JP | 2004-088437 | 3/2004 |
| JP | 2004-254053 | 9/2004 |
| JP | 2004-361814 | 12/2004 |
| JP | 2005-242099 | 9/2005 |
| JP | 2005-269077 | 9/2005 |
| JP | 2006-011534 | 1/2006 |
| JP | 2006-109127 | 4/2006 |

* cited by examiner

INDEX TABLE

| IDENTIFICATION INFORMATION | FIRST INDEX ELEMENT (THUMBNAIL OR MARK) | SECOND INDEX ELEMENT (CHARACTER INFORMATION) |
|---|---|---|
| 1 | aaa.gif | aaa.txt |
| 2 | bbb.gif | bbb.txt |
| 3 | clock.gif | ccc.txt |

| VIDEO DATA | THUMBNAIL | CHARACTER INFORMATION |
|---|---|---|
| 1 | aaa.gif | aaa.txt |
| 2 | bbb.gif | bbb.txt |
| 3 | clock.gif | ccc.txt |
| 4 | clock.gif | ddd.txt |
| 5 | clock.gif | eee.txt |
| 6 | clock.gif | fff.txt |

INFORMATION PROCESSING APPARATUS DISPLAYING INDICES OF VIDEO CONTENTS, INFORMATION PROCESSING METHOD AND INFORMATION PROCESSING PROGRAM

CROSS-REFERENCE TO RELATED APPLICATIONS

This application is a Continuation of application Ser. No. 11/865,992 filed on Oct. 2, 2007, which claims priority to Japanese Patent Application No. 2006-271184 filed with Japan Patent Office on Oct. 2, 2006, the entire contents of these applications are hereby incorporated by reference.

BACKGROUND OF THE INVENTION

1. Field of the Invention

The present invention relates to an information processing apparatus, an information processing method, and an information processing program, and more particularly to an information processing apparatus that displays indices of a plurality of video contents, an information processing method, and an information processing program.

2. Description of the Prior Art

In recent years, reproduction apparatuses are in widespread use which reproduce video contents recorded on recording media such as semiconductor memories and optical discs. When a plurality of video contents are recorded on a recording medium, it is necessary to select a desired video content from among them, and generally a menu screen is displayed for use in such selection. When a menu screen includes, for one video content, character information such as a title of the video content as well as a thumbnail that is a reduced version of an image, it may take time for the menu screen to be displayed. This is because the image data included in the video content is encoded, and thus, a certain period of time is required to decode the coded image data in order to generate the thumbnail. This problem occurs whether the image data is of a stationary image or a moving image. Thus, there is known a technique where, at the time of displaying a menu screen, an image such as an hourglass is displayed instead of a thumbnail before the thumbnail is generated, to inform the user that the thumbnail is being generated. Although a method of increasing the processing speed for the decoding processing may be conceivable, it would lead to an increased cost.

When the user performs another operation before the thumbnail is displayed on the menu screen, i.e., when the user performs an operation to scroll the menu screen for example, the reproduction apparatus would not be able to accept the operation, or even if it could accept the operation, it would not be able to execute the processing in accordance with the operation, because of the heavy load of the decoding processing for generating the thumbnail. This would require the user to wait until the menu screen is displayed, leading to degradation in responsivity of the reproduction apparatus.

BRIEF SUMMARY OF THE INVENTION

According to an aspect of the present invention, an information processing apparatus includes: a video content specifying portion to specify at least one of a plurality of video contents recorded on a recording medium; an index element generating portion, in response to acceptance of a generation instruction, to read a video content identified by identification information included in the generation instruction from the recording medium and generate an index element based on the read video content, and, in response to acceptance of a cancellation instruction, to stop generation of the index element based on the video content identified by identification information included in the cancellation instruction; a generation requesting portion, in response to the event that the video content is specified by the video content specifying portion, to output the generation instruction including the identification information identifying the specified video content to the index element generating portion; and a canceling portion, when a new video content is specified by the video content specifying portion at a stage before the index element corresponding to the video content already specified by the video content specifying portion is generated by the index element generating portion, to output the cancellation instruction to stop generation of the index element corresponding to the already specified video content to the index element generating portion.

According to another aspect of the present invention, an information processing method includes the steps of: specifying at least one of a plurality of video contents recorded on a recording medium; in response to acceptance of a generation instruction, reading a video content identified by identification information included in the generation instruction from the recording medium and generating an index element based on the read video content; in response to acceptance of a cancellation instruction, stopping generation of the index element based on the video content identified by identification information included in the cancellation instruction; in response to the event that the video content is specified, outputting the generation instruction including the identification information identifying the specified video content; and when a new video content is specified at a stage before the index element corresponding to the already specified video content is generated, outputting the cancellation instruction to stop generation of the index element corresponding to the already specified video content.

According to a further aspect of the present invention, an information processing program causes a computer to execute the steps of: specifying at least one of a plurality of video contents recorded on a recording medium; in response to acceptance of a generation instruction, reading a video content identified by identification information included in the generation instruction from the recording medium and generating an index element based on the read video content; in response to acceptance of a cancellation instruction, stopping generation of the index element based on the video content identified by identification information included in the cancellation instruction; in response to the event that the video content is specified, outputting the generation instruction including the identification information identifying the specified video content; and when a new video content is specified at a stage before the index element corresponding to the already specified video content is generated, outputting the cancellation instruction to stop generation of the index element corresponding to the already specified video content.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
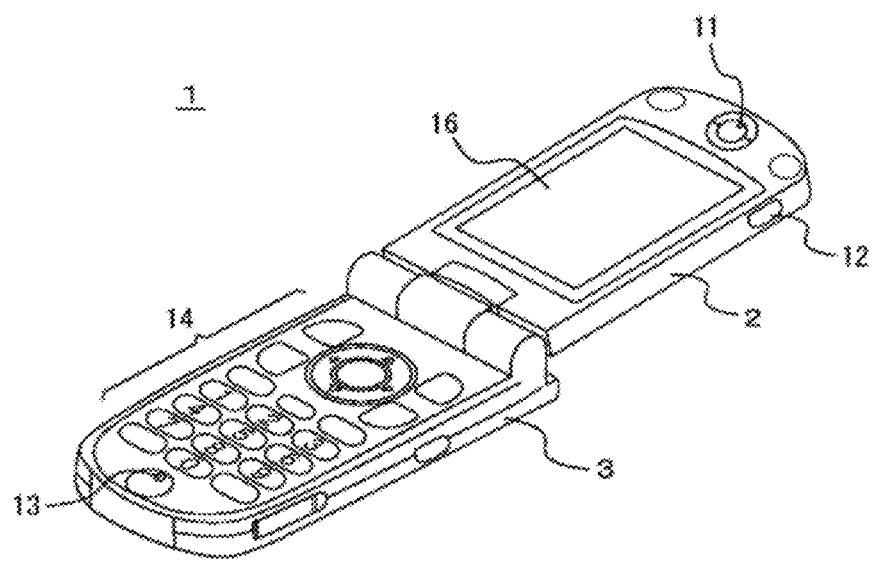
FIG. 1 is an external perspective view of a mobile phone according to an embodiment of the present invention.

An embodiment of the present invention will now be described with reference to the drawings. In the following description, like reference characters denote like parts, which have like names and functions, and therefore, detailed description thereof will not be repeated.

FIG. 1 shows a mobile phone according to an embodiment of the present invention. Referring to FIG. 1, the mobile phone 1 includes an operation-side portion 3 and a display-side portion 2. On an inner surface of operation-side portion 3, operation keys 14 including ten keys, a call key and the like and a microphone 13 are arranged, and on an outer surface opposite to the inner surface, a camera 24, which will be described later, is arranged. On an inner surface of display-side portion 2, a liquid crystal display (LCD) 16 and a first speaker 11 are arranged. On a side surface of display-side portion 2, a second speaker 12 is arranged. Although mobile phone 1 shown here is provided with LCD 16, LCD 16 may be replaced by an organic EL (ElectroLuminescence) display.

Operation-side portion 3 and display-side portion 2 are rotatably jointed to each other with a hinge mechanism, so that they can be opened and closed freely. The state of mobile phone 1 where mobile phone 1 is folded and thus operation-side portion 3 and display-side portion 2 are close to each other is called a closed style, while the state of mobile phone 1 where mobile phone 1 is opened and thus operation-side portion 3 and display-side portion 2 are apart from each other is called an open style.

Figure 2:
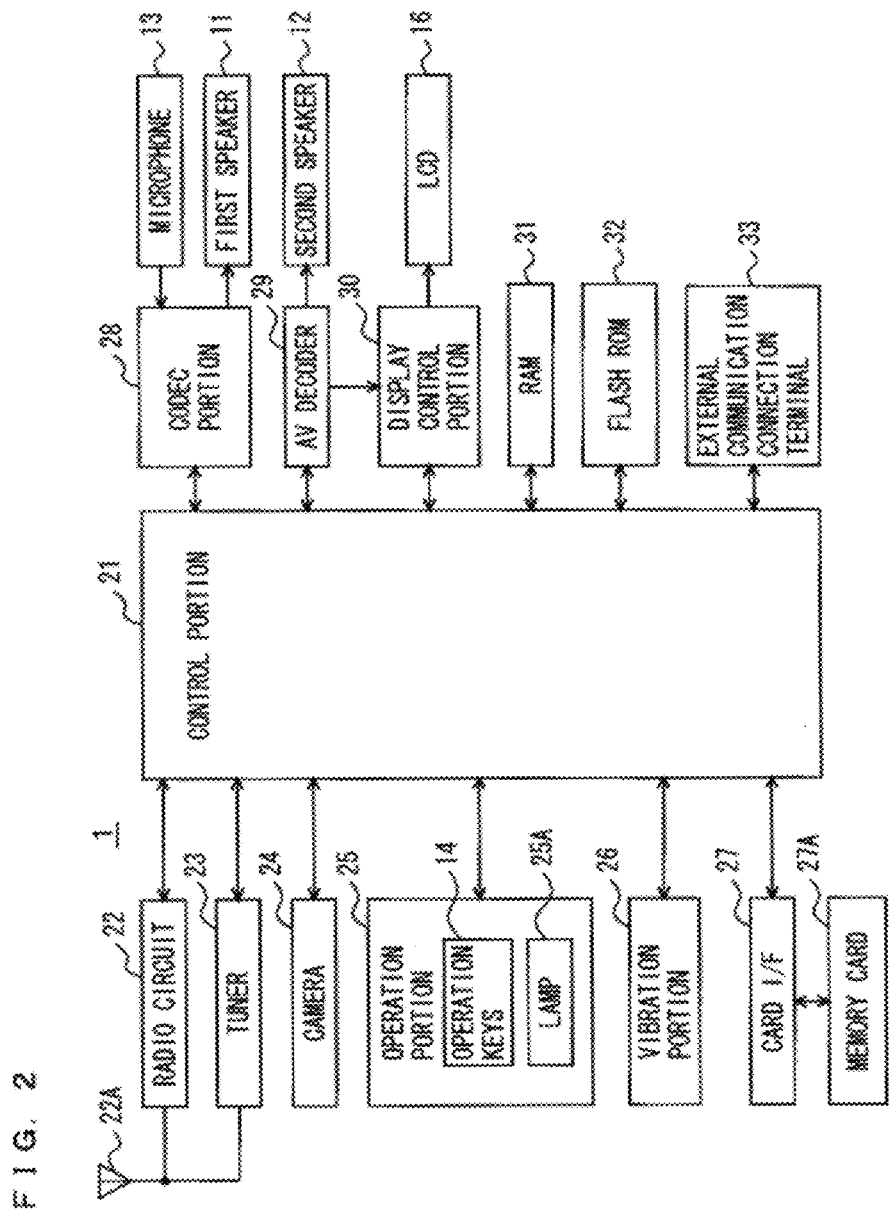
FIG. 2 is a functional block diagram showing an example of the function of the mobile phone.

FIG. 2 shows an example of the function of the mobile phone. Referring to FIG. 2, mobile phone 1 includes: a control portion 21 for overall control of mobile phone 1; a radio circuit 22 connected to an antenna 22A; a codec portion 28 for processing audio data; microphone 13 and first speaker 11 respectively connected to codec portion 28; a tuner 23 connected to antenna 22A; an AV decoder 29; a camera 24; an operation portion 25 to accept an input of an operation by a user; a display control portion 30 for controlling display on LCD 16; a RAM (Random Access Memory) 31 for use as a work area for control portion 21; a flash ROM (Read Only Memory) 32 for storing, e.g., a program to be executed by control portion 21; a vibration portion 26; a card interface (I/F) 27; and an external communication connection terminal 33 serving as a serial interface.

Radio circuit 22 receives a radio signal that is received by antenna 22A, and outputs an audio signal, obtained by demodulating the radio signal, to codec portion 28. Further, radio circuit 22 receives an audio signal from codec portion 28, and outputs a radio signal, obtained by modulating the audio signal, to antenna 22A. Codec portion 28 decodes an audio signal input from radio circuit 22, converts the decoded digital audio signal into an analog signal, and amplifies the same to be output to first speaker 11. Further, codec portion 28 receives an analog audio signal from microphone 13, converts the audio signal into a digital signal, and encodes the same and then outputs the coded audio signal to radio circuit 22.

Tuner 23 is connected to antenna 22A, and receives a broadcast signal that is received by antenna 22A. The broadcast signal is a high-frequency digital modulated signal including video and audio data. Tuner 23 takes out a signal of a specific frequency from the high-frequency digital modulated signal input from antenna 22A. Further, tuner 23 is provided with a reverse interleave circuit and an error correction circuit, and demodulates the obtained high-frequency digital modulated signal of the specific frequency and outputs the coded data to AV decoder 29. AV decoder 29 is provided with a video decoder and an audio decoder, and decodes the coded data input from tuner 23 to generate a video signal and an audio signal. It then subjects the video signal to D/A (digital/analog) conversion to be output to display control portion 30, and also subjects the audio signal to D/A conversion to be provided to second speaker 12. While the case of receiving and reproducing the digital television broadcast waves is shown here by way of example, the present invention is applicable to the case of receiving and reproducing analog television broadcast waves. Further, it may also be possible to receive and reproduce radio broadcast waves instead of, or in addition to, the television broadcast waves.

Display control portion 30, which is controlled by control portion 21, controls LCD 16 in accordance with an instruction input from control portion 21 to cause it to display images. The images displayed on LCD 16 include both moving and stationary images.

Camera 24 is provided with a lens and a photoelectric conversion element such as a CMOS (Complementary Metal Oxide Semiconductor) sensor or the like, where the lens collects light onto the CMOS sensor, and the CMOS sensor subjects the received light to photoelectric conversion and outputs the obtained image data to control portion 21. Camera 24, under the control of control portion 21, starts pickup of an image in accordance with an instruction from control portion 21, and outputs the obtained stationary or moving image data to control portion 21. Camera 24 is provided with an image processing circuit that carries out image processing for improvement of the quality of the image of the photoelectrically converted image data, and an A/D converter circuit that converts the image data from analog data to digital data. Control portion 21 outputs the stationary or moving image data output from camera 24 to display control portion 30 to be displayed on LCD 16, or, encodes the stationary or moving image data by compressive coding, and stores the same in flash ROM 32 or in a memory card 27A attached to card I/F 27, so that the video content is recorded on memory card 27A.

Operation portion 25 includes operation keys 14 and a lamp 25A. Operation keys 14 accept an input of an operation by a user, and output the accepted operation to control portion 21. Lamp 25A emits light under the control of control portion 21.

Removable memory card 27A is attached to card I/F 27. Memory card 27A may be a CompactFlash, SmartMedia (registered trademarks), SD (Secure Digital) memory card, memory stick, MMC (MultiMedia Card), xD picture card, or the like.

Control portion 21 can access memory card 27A via card I/F 27. When a video content is recorded on memory card 27A, control portion 21 reads the video content from memory card 27A and outputs the coded data included in the video content to AV decoder 29. AV decoder 29 decodes the coded data input from control portion 21 to generate video and audio signals, and subjects the signals to D/A conversion. It then outputs the converted video signal to display control portion 30 and outputs the converted audio signal to second speaker 12, whereby the video content is reproduced.

While the case of storing the program to be executed by control portion 21 in flash ROM 32 is explained here by way of example, it may be possible to store the program in memory card 27A and read the program from memory card 27A to be executed by control portion 21. The recording medium for storing the program is not restricted to memory card 27A. It may be a flexible disk, a cassette tape, an optical disc (CD-ROM (Compact Disc-ROM), MO (Magnetic Optical Disc), MD (Mini Disc), DVD (Digital Versatile Disc)), an optical card, or a semiconductor memory such as a masked ROM, an EPROM (Erasable Programmable ROM), or the like. Alternatively, mobile phone 1 may be connected to the Internet via radio circuit 22 and download the program from a computer connected to the Internet to be executed by control portion 21. As used herein, the "program" includes, not only the program directly executable by control portion 21, but also a source program, a compressed program, an encrypted program, and others.

Figure 3:
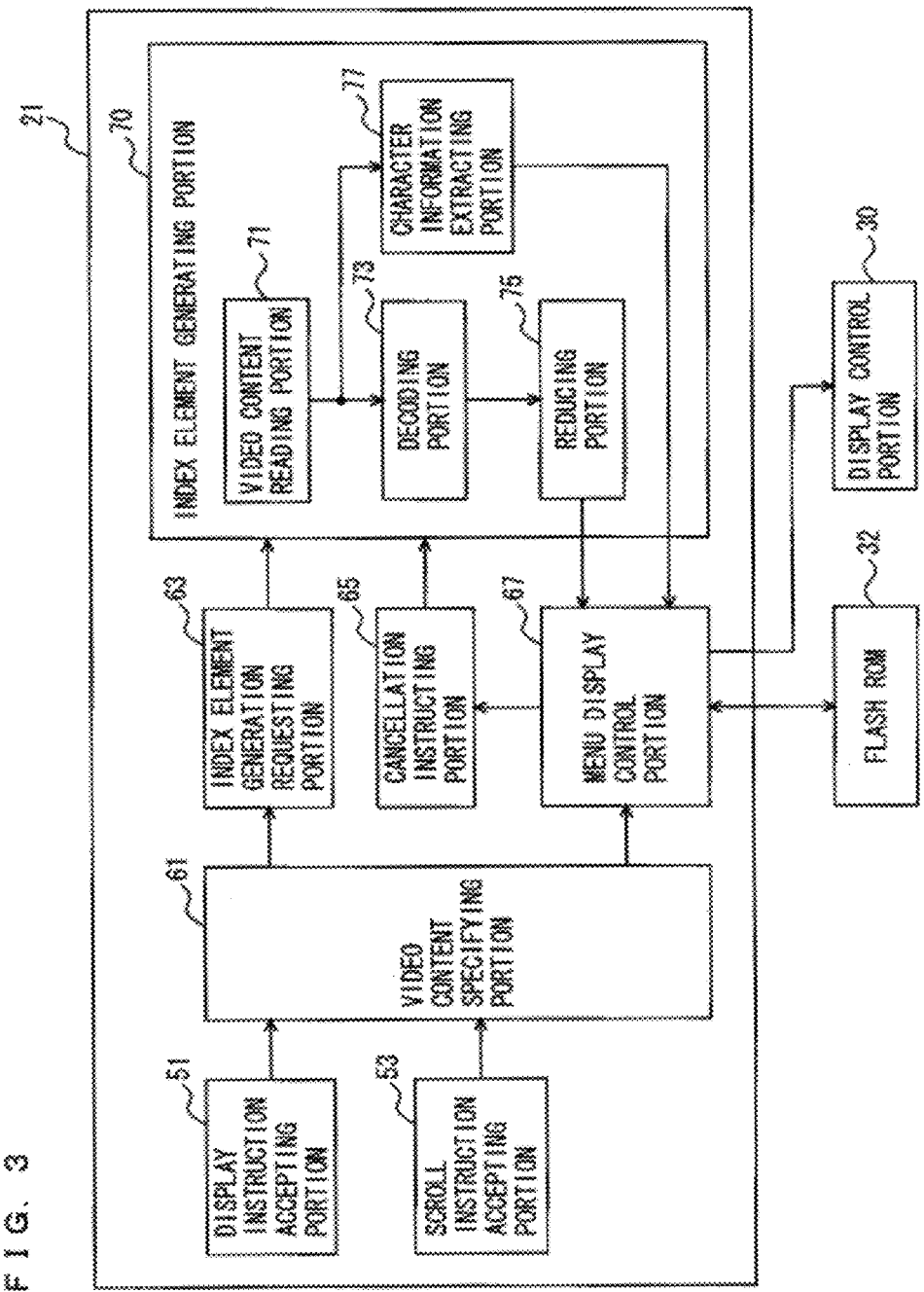
FIG. 3 is a functional block diagram schematically showing the function of a control portion.

FIG. 3 schematically shows the function of the control portion. Referring to FIG. 3, control portion 21 includes: a display instruction accepting portion 51 to accept an instruction to display a menu screen; a scroll instruction accepting portion 53 to accept an instruction to scroll the displayed menu screen; a video content specifying portion 61 to specify at least one of a plurality of video contents recorded on memory card 27A; an index element generation requesting portion 63 to request generation of an index element of the specified video content; an index element generating portion 70 to generate an index element; a menu display control portion 67 to display an index corresponding to the video content specified by video content specifying portion 61; and a cancellation instructing portion 65 to instruct stoppage of generation of the index element.

When the user depresses a pre-assigned key in operation keys 14 to instruct display of a menu screen, display instruction accepting portion 51 accepts a display instruction from operation portion 25. The menu screen includes an index for a video content stored in memory card 27A. Display instruction accepting portion 51 outputs the accepted display instruction to video content specifying portion 61.

When the display instruction is input, video content specifying portion 61 specifies at least one of a plurality of video contents recorded on memory card 27A to display an index thereof on the menu screen. Here, it is assumed that the menu screen includes at most three indices. Thus, when the display instruction is input, video content specifying portion 61 specifies three video contents from among the video contents stored in memory card 27A, and outputs identification information for identification of the specified three video contents to both index element generation requesting portion 63 and menu display control portion 67. Here, it is configured to assign serial numbers to the plurality of video contents stored in memory card 27A and use the serial numbers as the identification information of the video contents. The serial numbers may be determined in accordance with the feature values of the video contents, such as file names, dates of storage, or data amounts of the respective video contents. Alternatively, the user may designate the feature values of the video contents for use in determination of the serial numbers.

While the case of using the serial numbers assigned to the video contents as the identification information is explained here, the identification information may be unique information provided to the video contents, which may be file names thereof. In such a case, it is unnecessary to assign the serial numbers to the video contents. Furthermore, it may also be configured such that video content specifying portion 61 arbitrarily specifies any three video contents.

When the identification information of a video content is input from video content specifying portion 61, index element generation requesting portion 63 outputs, to index element generating portion 70, an instruction (generation instruction) including the relevant identification information to generate an index element. When a display instruction is input to video content specifying portion 61, video content specifying portion 61 outputs identification information of three video contents to index element generation requesting portion 63, and correspondingly, index element generation requesting portion 63 outputs three generation instructions, including the input three identification information items respectively, to index element generating portion 70.

Index element generating portion 70 generates an index element based on the video content. Here, the index element includes a thumbnail and character information for the video content. Index element generating portion 70 includes: a video content reading portion 71 to read a video content from memory card 27A; a decoding portion 73 to decode coded data included in the video content to output an image; a reducing portion 75 to reduce the image output from decoding portion 73 in size to generate a thumbnail; and a character information extracting portion 77 to extract character information included in the video content.

Video content reading portion 71 receives a generation instruction from index element generation requesting portion 63. When a generation instruction is input, video content reading portion 71 reads the video content specified by the identification information included in the generation instruction from memory card 27A, and outputs the read video content to both decoding portion 73 and character information extracting portion 77.

Decoding portion 73 decodes coded data included in the video content. The coded data corresponds to the data obtained by encoding moving or stationary image data. Decoding portion 73 decodes the coded data and outputs an image to reducing portion 75. In the case where the coded data is one obtained by encoding moving image data, decoding portion 73 selects one frame of the moving image, and outputs an image of the selected frame to reducing portion 75. Here, it may be configured to select a first one of a plurality of frames of the moving image, or may be configured to select a predetermined frame or an arbitrary frame.

Reducing portion 75 reduces the size of the input image to generate a thumbnail. It then outputs the generated thumbnail to menu display control portion 67 together with the identification information of the video content. The thumbnail image has a predetermined resolution.

Character information extracting portion 77 extracts character information included in the video content, and outputs the extracted character information to menu display control portion 67 together with the identification information of the video content. The video content includes character information in a predetermined portion thereof, which information is extracted by character information extracting portion 77.

While index element generating portion 70 can output the character information immediately after input of a generation instruction, it cannot output the thumbnail immediately, because a certain period of time is required for decoding the coded data for generation of the thumbnail. Thus, index element generating portion 70 generates a process of implementing the functions of video content reading portion 71, decoding portion 73, reducing portion 75, and character information extracting portion 77. More specifically, index element generating portion 70 generates an independent process every time a generation instruction is input. The process executes processing independent of another process. When index element generation requesting portion 63 outputs a plurality of generation instructions, index element generating portion 70 generates processes of the same number as that of the generation instructions input from index element generation requesting portion 63. The processes correspond to the identification information items included in the respective generation instructions, and are specified by the identification information items.

The process generated by index element generating portion 70 ceases to exist when character information extracting portion 77 outputs the character information and reducing portion 75 outputs the thumbnail. It is also nullified when a cancellation instruction is input, which will be described later. When a display instruction is input to video content specifying portion 61, video content specifying portion 61 outputs the identification information items of three video contents to index element generation requesting portion 63, and in turn, index element generation requesting portion 63 outputs three generation instructions corresponding respectively to the input three identification information items to index element generating portion 70. In this case, index element generating portion 70 generates three processes corresponding respectively to the three identification information items included in the input three generation instructions.

It is noted that index element generating portion 70 may have a circuit configuration. Specifically, since the menu screen includes at most three indices, index element generating portion 70 may have three circuits each including video content reading portion 71, decoding portion 73, reducing portion 75, and character information extracting portion 77. In this case, index element generation requesting portion 63 is configured to output three generation instructions to the three circuits, respectively.

When the identification information of a video content is input from video content specifying portion 61, menu display control portion 67 generates a menu screen including the index of the video content specified by the identification information, and outputs the same to display control portion 30. Accordingly, the menu screen generated by menu display control portion 67 is displayed on LCD 16.

Menu display control portion 67 receives, from index element generating portion 70, the character information and the thumbnail together with the identification information at different timings. Thus, menu display control portion 67 generates a menu screen in which an index corresponding to the identification information input from video content specifying portion 61 is associated with the character information input together with the identification information identical to the relevant identification information. Further, at the stage where the thumbnail that is to be input together with the identification information identical to the identification information input from video content specifying portion 61 has not been input yet, menu display control portion 67 generates a menu screen in which a mark indicating that the thumbnail is being generated is assigned to the index corresponding to the relevant identification information. Here, an image representing an hourglass is used as the mark indicating that the thumbnail is being generated, although not restricted thereto, the mark may be any information that can explicitly inform the user that the thumbnail is being generated, like a character string "GENERATING". When a thumbnail is input from index element generating portion 70, menu display control portion 67 generates a menu screen having the thumbnail associated with the index corresponding to the identification information that is input together with the thumbnail.

Figures 4, 5:
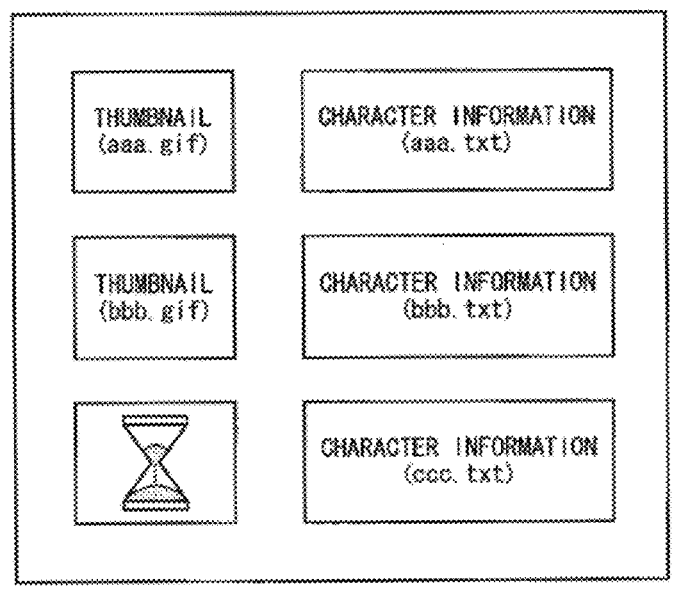
FIG. 4 is a first diagram showing an example of an index table.
FIG. 5 is a first diagram showing an example of a menu screen.

More specifically, menu display control portion 67 generates an index table in flash ROM 32. FIG. 4 shows an example of the index table. Referring to FIG. 4, the index table includes a record in which identification information of the video content, a first index element and a second index element are associated with each other. The first index element corresponds to a thumbnail for the video content identified by the identification information, or a mark indicating that the thumbnail is being generated. The second index element corresponds to character information extracted from the video content identified by the identification information.

Returning to FIG. 3, when the identification information of a video content is input from video content specifying portion 61, menu display control portion 67 generates a record including the identification information in the index table. At this stage, the mark indicating that the thumbnail is being generated, which is a file name of the image representing an hourglass in this example, is stored in the field of the first index element in the generated record, and a blank is set for the field of the second index element. When character information is input from index element generating portion 70, menu display control portion 67 stores the character information in flash ROM 32, while applying a file name thereto, and also stores the file name of the character information in the field of the second index element in the record on the index table that includes the same identification information as the one input together with the relevant character information. Further, when a thumbnail is input from index element generating portion 70, menu display control portion 67 stores the thumbnail in flash ROM 32, while applying a file name thereto, and also stores the file name of the thumbnail in the field of the first index element in the record on the index table that includes the same identification information as the one input together with the relevant thumbnail.

Every time the index table is updated, menu display control portion 67 selects three records from among the records included in the updated index table, and generates a menu screen based on the selected three records, which is output to display control portion 30.

The index table shown in FIG. 4 includes: a record having identification information "1" of the first video content, a file name "aaa.gif" of the thumbnail, and a file name "aaa.txt" of the character information associated with each other; a record having identification information "2" of the second video content, a file name "bbb.gif" of the thumbnail, and a file name "bbb.txt" of the character information associated with each other; and a record having identification information "3" of the third video content, a file name "clock.gif" of the hourglass image, and a file name "ccc.txt" of the character information associated with each other. Shown in FIG. 4 is the index table at the stage where, after a display instruction is accepted by display instruction accepting portion 51, the thumbnails for the first and second video contents have been generated in index element generating portion 70, whereas the thumbnail for the third video content has not been generated yet.

FIG. 5 shows an example of the menu screen. The menu screen shown in FIG. 5 is one generated by menu display control portion 67 based on the index table shown in FIG. 4.

While a rectangular area provided with the characters "THUMBNAIL" and its file name is shown in the figure, an image (thumbnail) having that file name is displayed in effect. Further, while a rectangular area provided with the characters "CHARACTER INFORMATION" and its file name is shown in the figure, the character information having that file name is actually displayed. For the index of the video data having the identification information "3", the image of the hourglass and the character information of the file name "ccc.txt" are displayed.

Returning to FIG. 3, when the user depresses a scroll key assigned in advance in operation keys 14 to change the index to be displayed on the menu screen, scroll instruction accepting portion 53 accepts a scroll instruction from operation portion 25. Scroll instruction accepting portion 53 outputs the accepted scroll instruction to video content specifying portion 61.

When the scroll instruction is input, video content specifying portion 61 specifies a next one of the plurality of video contents recorded on memory card 27A, and outputs the identification information for identification of the specified video content to both index element generation requesting portion 63 and menu display control portion 67. Here, since the serial numbers are assigned to the video contents stored in memory card 27A, the video content having the number following the number of the last video content specified theretofore is specified.

Every time the scroll instruction is input, video content specifying portion 61 specifies a video content. Thus, the identification information items of the same number as that of the input scroll instructions are output. As such, when the user inputs scroll instructions successively, generation instructions of the number corresponding to the number of the input scroll instructions are input from index element generation requesting portion 63 to index element generating portion 70.

Meanwhile, when a scroll instruction is accepted at scroll instruction accepting portion 53, menu display control portion 67 receives the identification information from video content specifying portion 61. Menu display control portion 67 deletes the first index on the menu screen, and generates a menu screen including the index of the video content specified by the newly input identification information as the last index, and outputs the same to display control portion 30. More specifically, when the identification information of a new video content is input from video content specifying portion 61, menu display control portion 67 generates and adds a record including the relevant identification information to the index table. It then selects the last three records on the index table, and generates a menu screen based on the selected three records, which is output to display control portion 30. Further, menu display control portion 67 outputs, to cancellation instructing portion 65, the identification information of the video content the index of which is no longer necessary to be displayed on the menu screen.

Figures 6, 7:
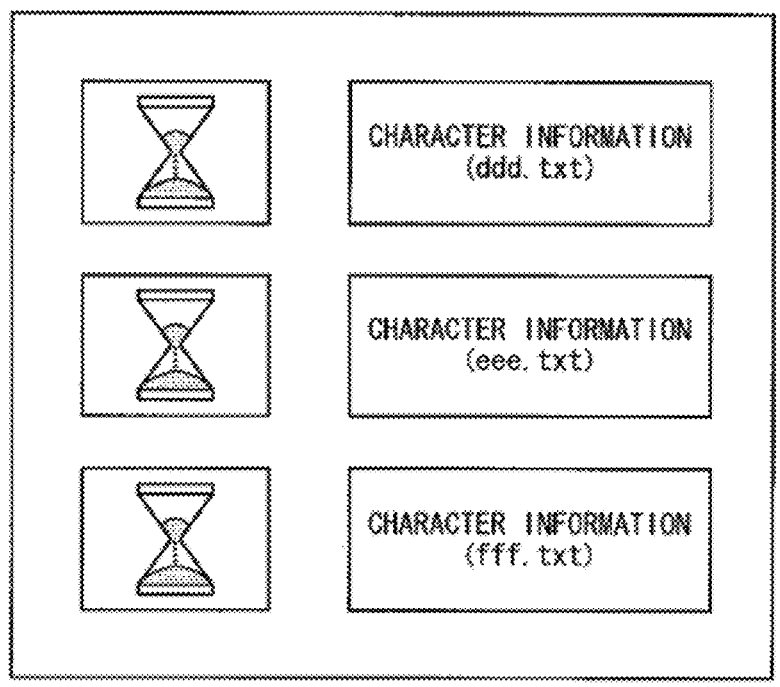
FIG. 6 is a second diagram showing an example of the index table.
FIG. 7 is a second diagram showing an example of the menu screen.

There may be a case where the index deleted from the menu screen does not include a thumbnail, depending on the input number of times of scroll instructions. This corresponds to the case, for example, when three scroll instructions are input successively at the stage where the menu screen shown in FIG. 5 is displayed. An example of the index table corresponding to this case is shown in FIG. 6, where three records are newly added compared to the index table shown in FIG. 4. FIG. 7 shows another example of the menu screen, which is generated by menu display control portion 67 based on the index table shown in FIG. 6. While the thumbnail for the video content having the identification information "3" is not displayed on the menu screen shown in FIG. 5, the menu screen shown in FIG. 7 displayed after successive input of three scroll instructions does not include the index for the video content having the identification information "3".

Meanwhile, since the generation instruction including the identification information "3" is already input to index element generating portion 70, index element generating portion 70 continues to generate the thumbnail for the video content having the identification information "3". Thus, cancellation instructing portion 65 outputs a cancellation instruction to cause index element generating portion 70 to stop generation of the thumbnail for the video content having the identification information "3". That is, at the stage before the thumbnail for the video content identified by "3" is generated by index element generating portion 70, if the identification information "3" of the video content for which it is no longer necessary to display the index on the menu screen is input from menu display control portion 67, cancellation instructing portion 65 outputs the cancellation instruction to stop generation of the thumbnail, including the relevant identification information "3", to index element generating portion 70. More specifically, cancellation instructing portion 65 reads the record including the identification information "3" input from menu display control portion 67 out of the index table stored in flash ROM 32, and refers to the first index element in the record to determine whether the file name stored in the field of the first index element corresponds to the file name of the thumbnail. If the file name stored in the field of the first index element is not the file name of the thumbnail but that of the hourglass image, cancellation instructing portion 65 outputs the cancellation instruction including the identification information "3" to index element generating portion 70.

When a cancellation instruction is input, index element generating portion 70 causes decoding portion 73 to stop decoding of the video content identified by the identification information included in the cancellation instruction, whereby the process generated for each identification information is nullified.

As such, in the case where a certain index is no longer necessary to be displayed on the menu screen, index element generating portion 70 stops generation of the index element included in the index, and thus, it is possible to reduce the load on control portion 21. Correspondingly, menu display control portion 67 can change the index displayed on the menu screen more speedily. Furthermore, index element generating portion 70 can generate a next thumbnail earlier in time.

While control portion 21 includes index element generating portion 70 in the present embodiment, index element generating portion 70 may be configured independently of control portion 21.

Figure 8:
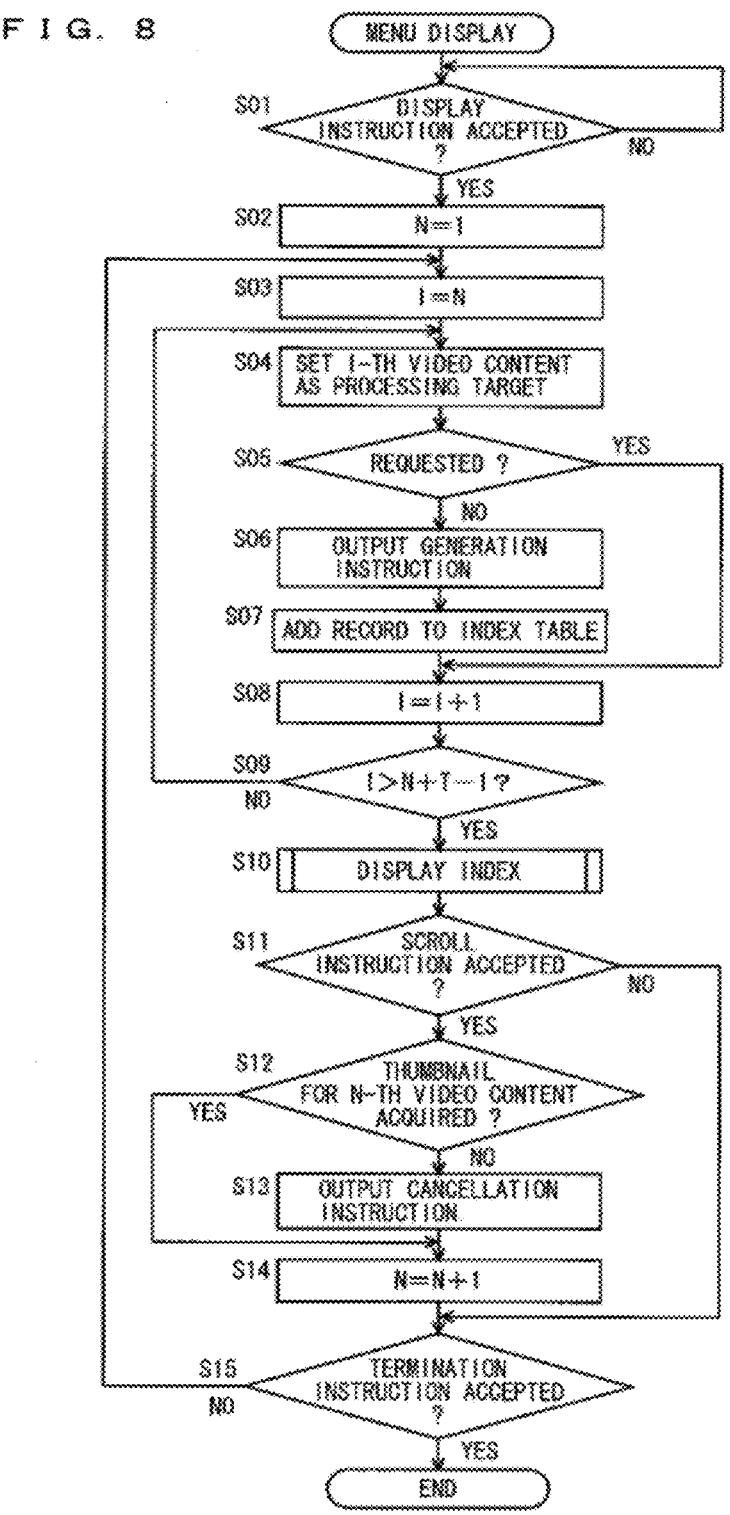
FIG. 8 is a flowchart illustrating an example of the flow of menu display processing.

FIG. 8 is a flowchart illustrating an example of the flow of menu display processing. The menu display processing is carried out by control portion 21 as it executes an index display program. Referring to FIG. 8, control portion 21 determines whether a display instruction of a menu screen has been accepted (step S01). When the user depresses a pre-assigned key in operation keys 14 to instruct display of a menu screen, a display instruction is accepted from operation portion 25. Control portion 21 is in the standby mode until the display instruction is accepted, and once the display instruction is accepted, the process proceeds to step S02. That is, the menu display processing is carried out on the condition that a display instruction is accepted.

In step S02, a variable N is set as 1. Variable N, representing the serial number assigned to each of a plurality of video contents stored in memory card 27A, corresponds to the identification information for identification of the video content. In the following step S03, the value of variable N is set to a variable I. Variable I corresponds to the identification information of the video content corresponding to the index to be displayed initially, or in the first place, on the menu screen. Since it is configured such that indices for three video contents are to be displayed on a menu screen, the indices of the video contents having the identification information of variables I, I+1 and I+2, respectively, are displayed on the menu screen.

In step S04, the I-th video content is set as a processing target. It is then determined whether generation of an index element for the I-th video content has already been requested (step S05). If the generation of the index element has not yet been requested, the process proceeds to step S06; whereas if it has already been requested, the process proceeds to step S08. In step S06, a generation instruction to instruct generation of an index element is output. The generation instruction includes identification information "I" of the I-th video content that has been set as the processing target. In the following step S07, a new record is added to the index table in flash ROM 32. The new record includes the identification information "I" of the I-th video content.

In the following step S08, variable I is incremented, and the process proceeds to step S09. In step S09, it is determined whether variable I is greater than a value (N+T 1). The constant T represents the number of indices that can be displayed on a menu screen, which is "3" in this example. If variable I is greater than the value (N+T 1), the process proceeds to step S10; otherwise, the process returns to step S04. When the process proceeds to step S10, generation instructions to generate index elements for the N-th through (N+T 1)-th video contents, respectively, are output.

Figure 9:
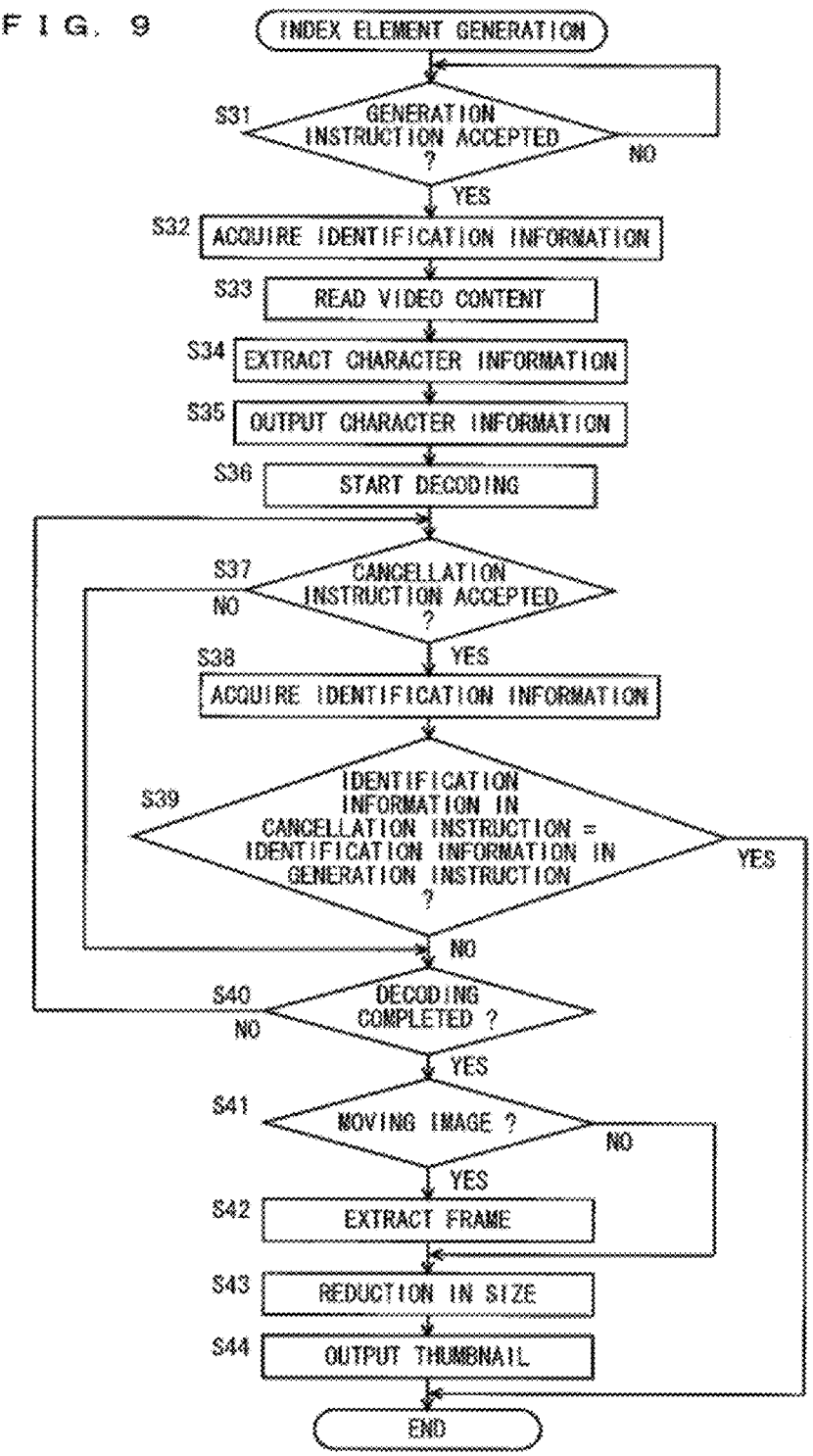
FIG. 9 is a flowchart illustrating an example of the flow of index element generation processing.

Hereinafter, index element generation processing will be described. FIG. 9 is a flowchart illustrating an example of the flow of the index element generation processing, which is carried out by control portion 21 as it executes the index display program. The index element generation processing is carried out as one process generated by control portion 21, which process is independent of the process of executing the menu display processing described above. Therefore, one or more processes to carry out the index element generation processing may be generated.

Referring to FIG. 9, control portion 21 determines whether a generation instruction has been accepted (step S31). The generation instruction is input from the process of carrying out the menu display processing. Control portion 21 is in the standby mode until a generation instruction is accepted (NO in step S31), and once the generation instruction is accepted, the process proceeds to step S32. That is, the process of carrying out the index element generation processing is carried out on the condition that the generation instruction is accepted from the process of carrying out the menu display processing. Thus, the process of carrying out the index element generation processing is identified by the identification information included in the generation instruction by the process of carrying out the menu display processing. It is noted that control portion 21 may generate the process of carrying out the index element generation processing at the time point when the process of carrying out the menu display processing outputs a generation instruction.

In step S32, the identification information of the video content included in the generation instruction is acquired. The video content identified by the identification information is read out of the video contents stored in flash ROM 32 (step S33), and character information is extracted from the read video content (step S34). Then, the extracted character information is output together with the identification information acquired in step S32 (step S35). The destination of the character information is the process of carrying out the menu display processing that had output the generation instruction.

In the following step S36, decoding of the coded data included in the video content read in step S33 is started. Then, in step S37, it is determined whether a cancellation instruction has been accepted. The cancellation instruction, which will be described later, is output by the process of carrying out the menu display processing, and includes the identification information of the video content. If the cancellation instruction is accepted, the process proceeds to step S38; otherwise, the process proceeds to step S40. In step S38, the identification information included in the cancellation instruction accepted in step S37 is acquired.

Then, in the following step S39, it is determined whether the identification information included in the cancellation instruction is identical to the identification information included in the generation instruction accepted in step S31. If so, the process is terminated; otherwise, the process proceeds to step S40. In step S40, it is determined whether decoding of the coded data started in step S36 is completed. If so, the process proceeds to step S41; otherwise, the process returns to step S37. That is, the process is terminated in the case where the decoding of the coded data has been started in step S36 and the cancellation instruction is accepted before completion of the decoding. In contrast, if the decoding is completed before acceptance of the cancellation instruction, the process proceeds to step S41.

In step S41, it is determined whether the image obtained as a result of decoding is a moving image. If so, the process proceeds to step S42; otherwise, the process proceeds to step S43, skipping the step S42. In step S42, one frame is extracted from the moving image. The first frame of the moving image may be extracted, or alternatively, a predetermined frame or an arbitrary frame may be extracted.

In step S43, the image is reduced in size to generate a thumbnail, and, in step S44, the generated thumbnail is output together with the identification information acquired in step S32. The destination of the thumbnail is the process of carrying out the menu display processing that had output the generation instruction.

Figure 10:
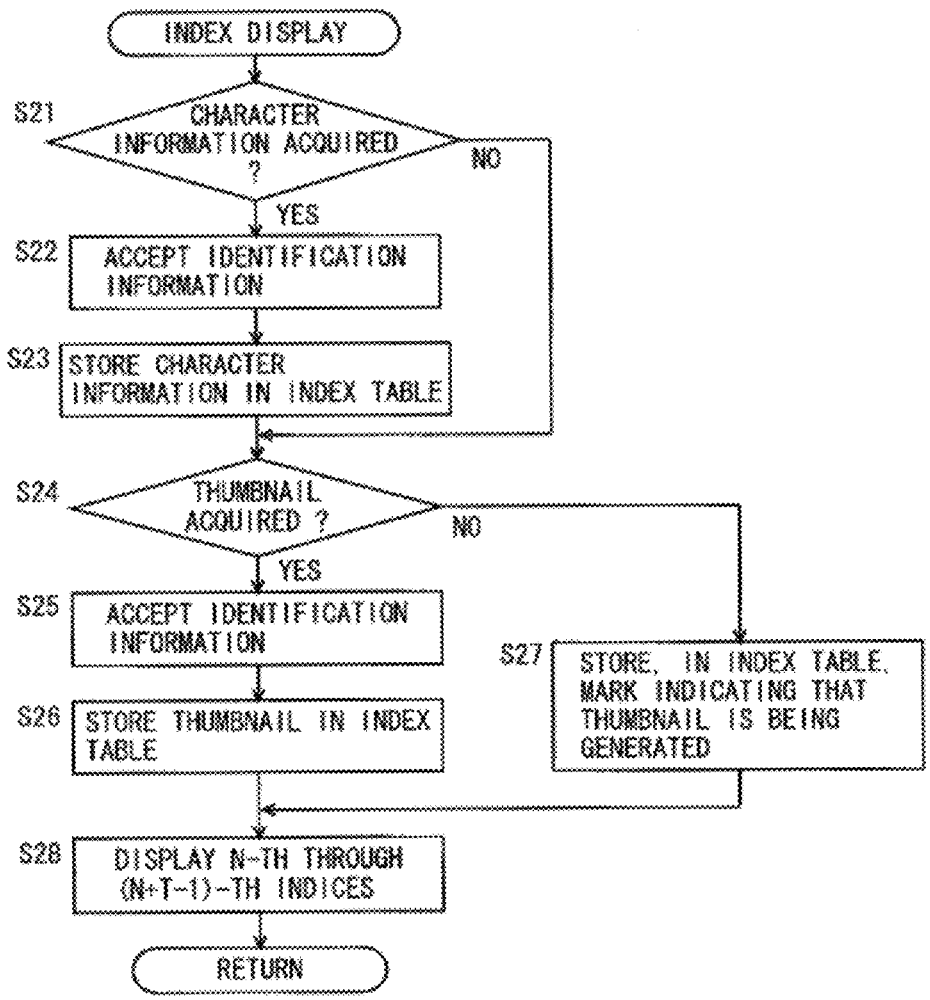
FIG. 10 is a flowchart illustrating an example of the flow of index display processing.

Returning to FIG. 8, in step S10, the index display processing is carried out. FIG. 10 is a flowchart illustrating an example of the flow of the index display processing. Referring to FIG. 10, control portion 21 determines whether character information has been accepted (step S21). The character information is output from the process of carrying out the index element generation processing described above. If the character information is accepted, the process proceeds to step S22; otherwise, the process proceeds to step S24.

In step S22, the identification information output together with the character information by the process of carrying out the index element generation processing is accepted. It is noted that the identification information may be acquired by identifying the process that outputs the character information. In such a case, the process of carrying out the index element generation processing outputs only the character information; it does not need to output the identification information. In the following step S23, the character information is stored in the index table stored in flash ROM 32, and the process proceeds to step S24. More specifically, the character information accepted in step S21 is applied with a file name, and is stored in flash ROM 32, and the file name of the character information is stored in the field of the second index element of the record that includes the identification information accepted in step S22.

In the following step S24, it is determined whether a thumbnail has been accepted. The thumbnail is output from the process of carrying out the index element generation processing described above. If the thumbnail is accepted, the process proceeds to step S25; otherwise, the process proceeds to step S27.

In step S25, the identification information output together with the thumbnail by the process of carrying out the index element generation processing is accepted (step S25). It is noted that the identification information may be acquired by identifying the process that outputs the thumbnail. In such a case, the process of carrying out the index element generation processing only needs to output the thumbnail, which does not need to output the identification information. In the following step S26, the thumbnail is stored in the index table stored in flash ROM 32, and the process proceeds to step S28. More specifically, the thumbnail accepted in step S24 is applied with a file name and stored in flash ROM 32, and the file name of the thumbnail is stored in the field of the first index element of the record that includes the identification information accepted in step S25.

Meanwhile, in step S27, a mark indicating that the thumbnail is being generated is stored in the index table stored in flash ROM 32, and the process proceeds to step S28. More specifically, the file name of the hourglass image stored in advance in flash ROM 32 is stored in the field of the first index element of the record that includes the identification information accepted in step S25.

In step S28, the N-th through (N+T 1)-th indices are displayed. Since constant T is "3" in this example, the indices are specifically displayed as follows. The record including the identification information "N" is read from flash ROM 32 and an index including the image having the file name corresponding to the first index element and the character information having the file name corresponding to the second index element of the read record is displayed as a first index in display order; the record including the identification information "N+1" is read from flash ROM 32 and an index including the image having the file name corresponding to the first index element and the character information having the file name corresponding to the second index element of the read record is displayed as a second index in display order; and the record including the identification information "N+2" is read from flash ROM 32 and an index including the image having the file name corresponding to the first index element and the character information having the file name corresponding to the second index element of the read record is displayed as a third index in display order. As such, a menu screen including the three indices is displayed. In the case where a display instruction is accepted, the menu screen includes: the index of the first video content as the first index in display order, the index of the second video content as the second index in display order, and the index of the third video content as the third index in display order.

Returning to FIG. 8, in step S11, it is determined whether a scroll instruction has been accepted. When the user depresses a scroll key assigned in advance in operation keys 14 to change the index on the menu screen, a scroll instruction is accepted from operation portion 25. If the scroll instruction is accepted, the process proceeds to step S12; otherwise, the process proceeds to step S15. In step S12, it is determined whether the thumbnail for the N-th video content has been acquired. If so, the process proceeds to step S14; otherwise, the process proceeds to step S13. The thumbnail for the N-th video content is the one that is no longer necessary to be displayed after acceptance of the scroll instruction. Control portion 21 reads the record including the identification information "N" from the index table stored in flash ROM 32, and determines whether the file name of the image of the thumbnail is stored in the field of the first index element. If the file name of the thumbnail image is stored, it is determined that the thumbnail for the N-th video content has been acquired. If the file name of the thumbnail image is not stored, it is determined that the thumbnail for the N-th video content has not been acquired yet.

That the thumbnail for the N-th video content has not been acquired means that the thumbnail is being generated in the process of carrying out the index element generation processing. Thus, in step S13, a cancellation instruction to stop generation of the thumbnail is output. The cancellation instruction includes the identification information "N". Among the plurality of processes of carrying out the index element generation processing, the process that accepted the generation instruction including the identification information "N" accepts the cancellation instruction and stops the processing. This can reduce the load on control portion 21. In the case where the process of carrying out the menu display processing can identify the plurality of processes of carrying out the index element generation processing, the cancellation instruction may be output to the process specified by the identification information "N". In such a case, the generation instruction does not need to include the identification information.

In step S14, variable N is incremented, and the process proceeds to step S15. In step S15, it is determined whether a termination instruction has been accepted. When the user depresses a pre-assigned key in operation keys 14 to instruct termination of display of the menu screen, a termination instruction is accepted from operation portion 25. If the termination instruction is accepted, the process is terminated; otherwise, the process returns to step S03.

In the case where step S10 is executed after the scroll instruction is accepted in step S11, variable N before acceptance of the scroll instruction is incremented by "1" after the scroll instruction is accepted. Thus, after the scroll instruction is accepted, the first index that was displayed on the menu screen before acceptance of the scroll instruction (i.e., the index of the N-th video content that was displayed as the first index in display order) is not displayed, and instead thereof, a new index is displayed on the menu screen as the third index in display order.

As described above, according to mobile phone 1 of the present embodiment, when a scroll instruction is input at the stage where the thumbnail for a video content is not yet displayed on the menu screen, generation of the thumbnail for the video content that is no longer necessary to be displayed on the menu screen is stopped, which reduces the load on control portion 21. This increases the speed of change of the index displayed on the menu screen. In other words, it is possible to quicken switching of the indices being displayed. Further, since index element generating portion 70 can generate the next thumbnail earlier in time, the response time until the menu screen is displayed after input of the scroll instruction can be reduced. In other words, it is possible to reduce the time required to display the index after switching the indices being displayed.

While mobile phone 1 has been described as an example of the information processing apparatus in the above embodiment, the information processing apparatus may be a reproduction apparatus such as a disk reproduction apparatus or the like, as long as it displays indices for a plurality of video contents stored in a recording medium. Further, not limited to the information processing apparatus, the present invention may of course be understood as an information processing method or an information processing program for carrying out the processing illustrated in FIGS. 8-10.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. An information processing apparatus comprising:
a storing portion to store video data;
a generating portion to read said video data from said storing portion, and to generate a first thumbnail corresponding to a first image of the video data by decoding the video data to form the first image and reducing the first image to form the first thumbnail; and
a display portion to display said first thumbnail, wherein said generating portion, in response to an acceptance of a scroll instruction, generates a second thumbnail to be next displayed by said display portion by decoding the video data to form a second image and reducing the second image to form the second thumbnail, wherein if the scroll instruction is received prior to completion of generation of the first thumbnail, generation of the first thumbnail is cancelled and generation of the second thumbnail is commenced.

2. The information processing apparatus according to claim 1, wherein:
the display portion displays a third image while the generating the first or second thumbnail.

3. The information processing apparatus according to claim 2, wherein:
the third image includes an hourglass image.

4. An information processing method executed by an information processing apparatus which comprises a storing portion to store video data, said information processing method comprising the steps of:
reading said video data from said storing portion;
generating a first thumbnail corresponding to a first image of said video data by decoding the video data to form the first image and reducing the first image to form the first thumbnail;
displaying said first thumbnail; and
in response to an acceptance of a scroll instruction, generating a second thumbnail to be next displayed in said displaying step by decoding the video data to form a second image and reducing the second image to form the second thumbnail, wherein if the scroll instruction is received prior to completion of generation of the first thumbnail, generation of the first thumbnail is cancelled and generation of the second thumbnail is commenced.

5. A non-transitory computer-readable recording medium encoded with an information processing program executed in a computer controlling an information processing apparatus which comprises a storing portion to store video data, said information processing program causing said computer to execute the steps of:
reading said video data from said storing portion;
generating a first thumbnail corresponding to a first image of said video data;
displaying said first thumbnail; and
in response to an acceptance of a scroll instruction, generating a second thumbnail to be next displayed in said displaying step by decoding the video data to form a second image and reducing the second image to form the second thumbnail, wherein if the scroll instruction is received prior to completion of generation of the first thumbnail, generation of the first thumbnail is cancelled and generation of the second thumbnail is commenced.

* * * * *